United States Patent [19]

Czarnocki et al.

[11] Patent Number: 4,854,167
[45] Date of Patent: Aug. 8, 1989

[54] MASS FLUID FLOW SENSOR

[75] Inventors: Walter S. Czarnocki, Schaumburg; Peter W. Harper, Crystal Lake; Kevin S. Moran, Algonquin; Steven W. Alexander, Schaumburg, all of Ill.

[73] Assignee: Motorola Inc., Schaumburg, Del.

[21] Appl. No.: 94,953

[22] Filed: Sep. 9, 1987

[51] Int. Cl.$^4$ .............................................. G01F 1/68
[52] U.S. Cl. .................................... 73/204.19
[58] Field of Search ........... 73/209.11, 204.19, 861.02, 73/861.03, 118.2

[56] References Cited

U.S. PATENT DOCUMENTS

| | | | |
|---|---|---|---|
| 3,645,133 | 2/1972 | Simeth et al. | 73/204 |
| 3,975,951 | 8/1976 | Kohama et al. | 73/116 |
| 4,294,114 | 10/1981 | Lauterbach | 73/204 |
| 4,345,465 | 8/1982 | Gruner et al. | 73/204 |
| 4,373,387 | 2/1983 | Nishimura et al. | 73/204 |
| 4,392,382 | 7/1983 | Myers | 73/708 |
| 4,446,523 | 5/1984 | Reinke | 73/861.52 |
| 4,475,388 | 10/1984 | Kawai et al. | 73/204 |
| 4,566,320 | 1/1986 | Bohrer | 73/204 |
| 4,682,496 | 7/1987 | Miura et al. | 73/204 |

Primary Examiner—Stewart J. Levy
Assistant Examiner—Robert P. Bell
Attorney, Agent, or Firm—Phillip H. Melamed

[57] ABSTRACT

A mass fluid flow sensor is disclosed which utilizes a sensing bridge circuit to develop a sense (control) signal related to fluid flow. A fluid temperature variable resistor, separate from said bridge circuit, is utilized to implement temperature compensation so that a desired output signal is a function of sensed fluid flow, but is less dependent on fluid temperature than the sense (control) signal provided by the bridge circuit. A resistor in the bridge circuit is selected such that the sense (control) signal provided by the bridge circuit has a rate of change as a function of flow rate substantially independent of fluid temperature, but this sense signal still varies as a function of fluid temperature. This permits fluid temperature compensation of the bridge sense signal in a noncomplex and cost effective manner.

20 Claims, 2 Drawing Sheets

MASS FLUID FLOW SENSOR

CROSS REFERENCE TO RELATED APPLICATION

The present invention is related to the invention described in copending U.S. patent application Ser. No. 020,248, filed Feb. 27, 1987, entitled, "Mass Air Flow Sensor", by Kevin Moran and Peter J. Shak now U.S. Pat. No. 4,776,214, having the same assignee as the present invention.

BACKGROUND OF THE INVENTION

The present invention is related to mass fluid (gas or liquid) flow sensors which provide an output signal related to sensed fluid flow rate. More specifically, the present invention is related to fluid flow sensors which produce a signal related to sensed fluid flow in accordance with sensed heat transfer between a heater element positioned in the fluid flow to be sensed and the fluid.

Essentially, there are two types of fluid flow sensors which utilize a heater element and depend upon the heat transfer between the heater and the fluid to produce an output signal related to fluid flow. One of these types of fluid flow sensors comprises a constant power-type flow sensor in which constant power or constant current is supplied to a heater resistor. The heater resistor is positioned in the fluid flow to be measured. An adjacent temperature variable resistor is positioned downstream in the fluid flow and is utilized to sense the heat transfer between the heater and the fluid, and, with other circuitry, to produce a voltage related to fluid flow. Another type of sensor consists of a hot anemometer sensor in which a bridge circuit, which includes a heater resistor having a temperature variable resistance characteristic, is utilized to produce an output bridge balance voltage that determines a control signal which controls the amount of power dissipation of the heater resistor so as to provide the heater resistor at a predetermined temperature above fluid temperature. The heater resistor temperature for such "constant temperature" sensors is maintained constant for any fluid flow rate in the range of flow rates to be measured, assuming a contant temperature for the incoming fluid passing by the heater resistor. Each of these sensors use a sense circuit, thermally or electrically coupled to the heater, to develop a fluid flow rate signal. Both of these types of fluid flow sensors are well known, and each has been suggested for use in automotive vehicle applications for use in sensing the mass air flow into the vehicle engine or the fuel flow into the engine. The sensed air flow or fuel flow is then utilized by engine control electronics to optimize engine performance and fuel combustion.

In mass fluid flow sensors of the above-described types, typically it is difficult to cost effectively minimize flow error readings which occur due to changes in fluid temperature so that error flow readings are substantially independent of fluid temperature. Changes in fluid temperature can result in either changes in the heat transfer characteristics of the fluid or changes in the relative proportion of the types of heat transfer which exists between the heater and the fluid, such as changing the relative proportion of heat transfer which occurs due to conduction, free convection and/or radiation.

While some fluid flow sensors attempt to compensate for changes in fluid temperature by sensing fluid temperature and producing a compensation signal, typically the output signal of such sensors is not substantially independent of fluid temperature, thus resulting in errors in sensed fluid flow. While one prior constant power sensor has proposed developing a compensating signal related to sensed fluid temperature which has a variation that directly opposes the flow sense signal variation produced by a fluid sensor as a function of fluid temperature, this involves generating a substantially nonlinear temperature varying signal which must directly match the nonlinear variation of the sense signal as a function of temperature. Such compensation is difficult to achieve in a cost effective manner. Also, prior flow sensors have not recognized that heat transfer to the fluid is a complex function of both fluid temperature and flow rate so that providing the proper temperature compensation for one flow rate does not insure proper temperature compensation for a substantial range of flow rates.

The above problems exist even though most of the two different types of fluid flow sensors discussed above already utilize a temperature sensitive element for sensing fluid temperature. While this aids in improving sensing accuracy, additional accuracy is needed if such sensors are to be used for efficient vehicle engine control. Thus the prior art has not provided a cost effective technique for providing a sensed fluid flow rate signal which is substantially independent of fluid temperature and has improved accuracy.

SUMMARY OF THE INVENTION

An object of the present invention is to provide an improved mass fluid flow sensor which overcomes the above-mentioned deificiencies of prior sensors.

A feature of the present invention has application to either fluid flow rate sensors which maintain the heater at a constant temperature or constant power or current fluid flow rate sensors. This feature comprises a mass fluid flow sensor in which a fluid flow sense circuit is essentially adjusted to produced a sense signal which has an amplitude which varies as a function of the sensed fluid flow wherein the rate of change of the sense signal over a substantially range of fluid flow rates to be measured is substantial independent of fluid temperature but the senses signal amplitude varies as a function of fluid temperature. This essentially means that for a plurality of different fluid temperatures, the transfer characteristic between the sense voltage and the flow rate comprises a plurality of parallel curves each having substantially the same general shape but spaced apart from one another for each one of the plurality of different fluid temperatures. Another way of stating this is that while sense signal amplitude varies as a function of fluid flow rate and fluid temperature, the variation of the sense signal as a function of fluid temperature is substantially independent of the fluid flow rate over a substantial range of fluid flow rates. A correction circuit then effectively combines this sense signal with a reference signal substantially independent of fluid flow produced by a temperature variable resistor which senses fluid temperature. The resultant output signal of the correction circuit is substantially less dependent on fluid temperature than the sense signal.

Preferably, the above latter-stated feature is utilized in conjunction with a bridge-type hot film fluid sensor which develops a control voltage to determine the amount of power dissipation in the heater resistor, and wherein the bridge circuit includes an adjustable (selectable) resistor having its magnitude selected to provide the sense signal as described above. Preferably, the variation of the sense signal as a function of fluid temperature is substantially linear, and this simplifies and renders cost effective the generation of the reference signal utilized by the correction circuit. However, in any event, the fact that temperature variation of the sense signal being corrected is independent of fluid flow, simplifies temperature compensation while improving sensor accuracy over a range of fluid flows.

An improved adjustable circuit for producing a desired temperature variable output signal is also provided. This circuit is useable in the flow sensors described herein.

The above-discussed advantages and features of the present invention, as well as others, are more fully described and can be better appreciated by reference to the subsequent detailed description of the present invention.

BRIEF DESCRIPTION OF THE DRAWINGS

For a more complete understanding of the present invention, reference should be made to the drawings in which.

DETAILED DESCRIPTION OF THE PREFERRED EMBODIMENTS OF THE INVENTION

Figure 1:
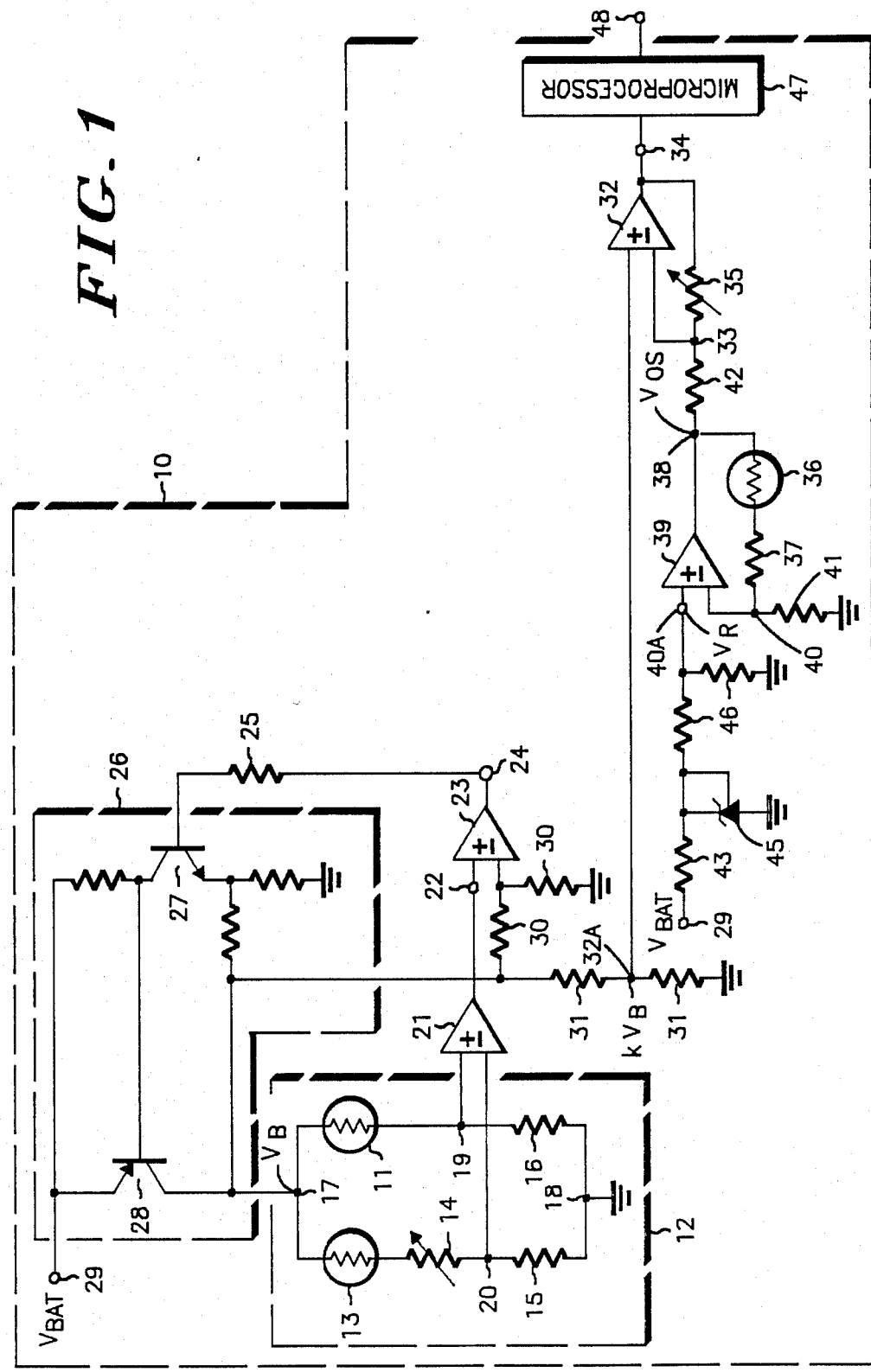
FIG. 1 is a schematic diagram of a mass fluid flow sensor embodying the present invention.

Referring to FIG. 1, a schematic diagram of a mass fluid flow rate sensor 10 embodying the present invention is illustrated. The sensor 10 essentially comprises a hot film bridge-type mass fluid flow sensor in which the power dissipation of the hot film (comprising a heater element) is controlled so as to provide a predetermined amount of heat transfer between the hot film and a fluid (either gaseous or liquid) the flow of which is to be measured. However, it should be noted that certain aspects of the present invention are also applicable to constant power or constant current fluid flow sensor circuits which rely on heat transfer from a constant power dissipation heater resistor to sensing elements located downstream of the heater resistor in the fluid.

The sensor 10 includes a low magnitude heater resistor 11 which has a substantial positive temperature coefficient of resistance. The heater resistor 11 is positioned in one arm of a four-arm bridge circuit generally indicated by the reference number 12 in FIG. 1. The bridge circuit 12 includes, in another bridge arm separate from the bridge arm containing heater resistor 11, a temperature variable resistor 13, also having a substantial positive temperature coefficient of resistance. The resistor 13 is connected in series with a nontemperature varying, with respect to the temperature of the fluid being sensed, resistor 14. The bridge circuit 12 also includes resistors 15 and 16 shown in FIG. 1 with resistors 13 through 15 forming a first series circuit path between a bridge power supply terminal 17 of the bridge circuit, at which a controllable power supply voltage is applied, and a reference terminal 18 of the bridge circuit which is directly connected to a fixed reference potential comprising ground potential. The heater resistor 11 and the resistor 16 are connected in series and form a second series circuit path between the terminals 17 and 18. Balance of the bridge circuit is determined by comparing the voltage at a terminal 19 between the heater resistor 11 and the resistor 16 with the voltage at a terminal 20 corresponding to a series connection point between the resistors 14 and 15.

The bridge balance terminals 19 and 20 are provided as inputs to a differential amplifier 21 which provides an amplified difference output at a terminal 22 which is provided as one input to another differential amplifier 23. The output of the amplifier 23 comprises an analog control signal that is provided at a terminal 24 which is provided, via a resistor 25, as an input to a driver stage 26 shown dashed in FIG. 1. The driver stage 26, as shown in FIG. 1, comprises an NPN transistor 27 and a PNP transistor 28 connected as shown between a battery supply terminal 29, at which a battery voltage $V_{BAT}$ is provided, and the bridge power supply terminal 17, at which a controllable analog bridge power supply voltage $V_B$ is provided. In addition, the bridge power supply terminal 17 is also connected, via a voltage divider circuit 30 as a second input to the differential amplifier 23.

The circuit elements 11 through 30, as described above, essentially comprise a bridge-type hot film mass fluid flow rate sensor in which the magnitude of bridge balance is sensed by the differential amplifier 21, and a control signal is provided at the terminal 24 which controls the voltage at the terminal 17 and the current provided by the driver stage 26. The operation of the above-described circuitry in providing a signal related to mass fluid flow can best be understood by referring to FIG. 2 which illustrates the positioning of the heater resistor 11 and temperature variable resistor 13 in the fluid, the flow of which is to be sensed.

Figure 2:
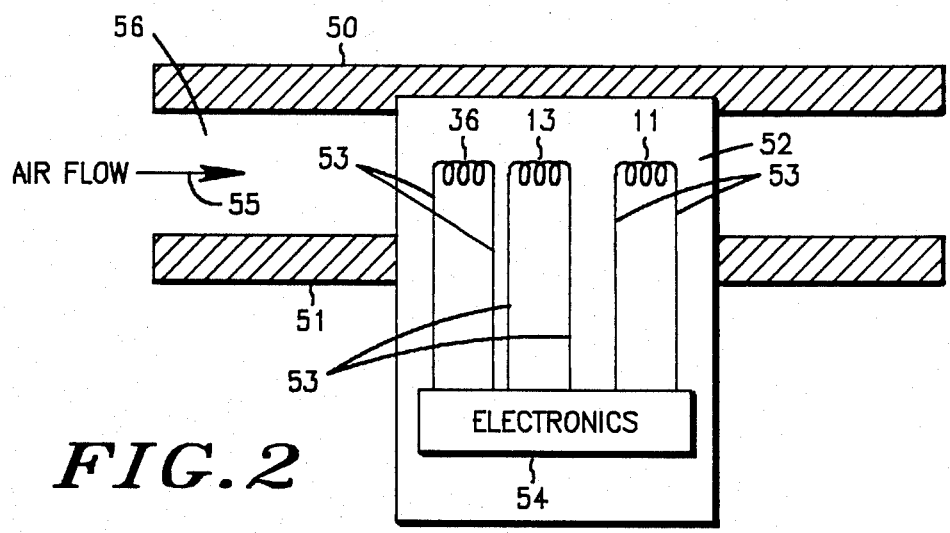
FIG. 2 is a combined cross section and schematic drawing illustrating a fluid flow path and the location of the sensing elements of the present invention with respect to the fluid flow path.

Referring to FIG. 2, a fluid flow path 55 for a fluid 56 is defined by walls 50 and 51 across which a thin electrically insulating polyimide film 52 is positioned. The film 52 is positioned edgewise so that it provides minimum opposition to the flow path 55. On the polyimide film 52, the heater resistor 11 is implemented via a temperature-dependent, low-resistance, metallization film deposited on the substrate 52. Also on the polyimide film 52, the temperature varying resistor 13, which has a much higher resistance than heater resistor 11, is deposited as a film metallization. Connections to the resistive films 11 and 13 are provided by conductor metallization paths 53 also provided on the film 52. The paths 53 connect film resistors 11 and 13 to additional sensor electronics, generally designated by the reference number 54 in FIG. 2, also, preferably, mounted on an extension of the film 52. It is understood that the electronics 54 in FIG. 2 includes at least the circuit elements 21 through 30 in FIG. 1.

The function of the sensor 10 is to provide a signal indicative of the mass fluid flow rate of the fluid 56. Preferably, the sensor 10 will sense mass fluid flow in a predetermined direction corresponding to the flow path 55 in FIG. 2. The heater resistor 11 is positioned in the fluid 56, the flow of which is to be sensed, with the temperature varying resistor 13 also being positioned in the fluid 56, but positioned upstream, with respect to the flow path 55, with respect to the heater resistor 11. Preferably, the fluid flow to be sensed comprises air flow into an internal combustion engine, such that the mass fluid flow sensor 10 corresponds to a mass air flow sensor. The operation of the fluid flow sensor 10, as described above, will now be discussed in connection with FIGS. 1 and 2.

Essentially, the driver stage 26 will provide some voltage at the bridge power supply terminal 17 which will result in heater resistor 11 producing a significant amount of power dissipation, in the form of heat, some of which will be transferred to its surroundings, including fluid 56. The polyimide film 52 is relatively thermally nonconductive, so that heat due to the power dissipation of the heater resistor 11 will primarily be transferred to the fluid 56. The temperature varying resistor 13 in the bridge 12 will dissipate only a very minimal amount of power and, therefore, not result in any substantial self-heating of this resistor. These relationships are due to the fact that the second bridge circuit path comprising heater resistor 11 and resistor 16 has a substantially lower resistance than the first bridge circuit path comprising resistors 13 through 15. It should be noted that the temperature of the heater resistor 11 is intended to be maintained at a predetermined temperature above the temperature of the fluid 56 (preferably 70° C. above fluid temperature) wherein this is due to the substantial power dissipation which will take place in the resistor 11 due to self-heating. This is contrasted with resistor 13 which will be essentially maintained at the same temperature of the fluid 56 the flow rate of which is to be measured.

Essentially, the driver stage 26, in accordance with the control signal at the terminal 24, provides a voltage at the bridge power supply terminal 17. This results in the temperature of the heater resistor 11 being at a predetermined temperature above the temperature of the fluid 56 whose flow rate is to be measured. When the flow rate of this fluid increases, assuming that the fluid temperature upstream of the film 52 remains constant, this will result in additional cooling of the heater resistor 11 due to increased heat transfer between the fluid and the heater resistor 11. This, in turn, results in a lowering of the resistance of the resistor 11, and this results in a transient unbalancing of the bridge circuit 12. This bridge imbalance will tend to produce a larger signal at the terminal 22 resulting in a larger control voltage at the terminal 24. This control voltage increase will result, via the driver stage 26, in providing a voltage increase at the bridge power supply terminal 17, thereby resulting in increased current through the resistor 11. This current increase increases the temperature of the heater resistor and tends to restore the bridge circuit 12 to balance. Essentially, the control voltage at the terminal 24 will tend to implement a servo control of the bridge circuit 12 to maintain this bridge in a state of balance for any sensed fluid flow. This is achieved by controlling the voltage at the bridge power supply terminal 17 to create such a balanced state.

From the foregoing description it can be seen that both the control voltage at the terminal 24 and the bridge power supply voltage at the terminal 17 have analog amplitudes which vary in accordance with sensed mass fluid flow, and therefore these signals are indicative of sensed fluid flow. Temperature sensitive resistor 13 is provided in the bridge circuit 12 to attempt to compensate for the effect of changes in fluid temperature on the fluid flow signals provided at the terminals 24 and 17. The type of system as described above is known and well understood, and the mechanical configuration discussed above with respect to FIG. 2 is also known as per the above-referenced copending U.S. patent application 020,248, filed Feb. 27, 1987, and assigned to the same assignee as the present invention.

While the function of flow sensors constructed in accordance with the preceding description of FIGS. 1 and 2 is to provide an output mass fluid flow rate signal which is independent of fluid temperature, this has only been achieved with moderate success. The present invention recognizes that the fluid temperature compensation provided by the resistor 13 typically will not be sufficient for critical flow sensing applications such as the sensing of mass air flow where the air is to be mixed with a fuel mixture for ignition in a vehicle internal combustion engine. In such an application, it is extremely important to have an accurate flow sense signal which is independent of air temperature since air temperature can vary greatly. While resistor 13 does tend to minimize variations of the flow signal at the terminal 24 as a function of fluid (air) temperature, measurements have shown that an appreciable dependency on fluid flow temperature still exists for sensors constructed as described above. Thus the present invention seeks to provide additional correction and temperature compensation for such circuits, and this is accomplished in the following manner.

The voltage at the bridge power supply terminal 17 comprises an analog signal which is related to and which varies substantially identically as the control signal at the terminal 24. For the sensor 10 in FIG. 1, the signal at terminal 17 is coupled to a correction circuit means, via a voltage divider 31, so as to provide an input to a differential amplifier 32 which is part of the correction circuit means. The voltage divider 31 and differential amplifier 32 essentially receive the signal at the terminal 17 and effectively modify it in accordance with a received predetermined analog reference signal received at a terminal 33 to provide a desired analog output signal at a terminal 34. The magnitude of this output signal is related to both the signal at the terminal 17 and the reference signal at the terminal 33. The gain of the differential amplifier 32 is adjustable via an adjustable magnitude resistor 35 connected between the terminals 34 and 33.

A compensating temperature variable circuit element, comprising an additional temperature sensitive resistor 36, which is separate from the bridge circuit 12 and control circuit elements 21-30, is positioned as shown in FIG. 2 in the fluid 56. The resistor 36 is positioned upstream of the heater resistor 11 and also upstream of the temperature varying resistor 13. The temperature variable resistor 36 has a substantial positive temperature coefficient of resistance, and therefore its resistance varies as a function of fluid temperature but is substantially independent of the fluid flow rate. This is because the temperature varying resistor 36, like the temperature varying resistor 13, will exhibit minimal power dissipation such that changes in flow rate will have substantially no effect on the resistances of resistors 13 and 36.

Referring again to FIG. 1, the temperature varying resistor 36 is connected in series with a nontemperature varying, with respect to fluid temperature, resistor 37 between an output terminal 38 of a differential operational amplifier 39 and an inverting input terminal 40 of this amplifier. The terminal 40 is connected to ground through a resistor 41, and the amplifier output terminal 38 is connected through an isolation resistor 42 to the terminal 33. A noninverting (positive) input terminal 40A of the differential amplifier 39 will receive a fixed reference voltage. This fixed reference voltage is provided by a resistor 43 connected between the battery voltage terminal 29 and a terminal 44. A voltage reference semiconductor device 45 is connected between the terminal 44 and ground potential. A resistor divider network 46 is connected, as shown in FIG. 1, between terminals 44 and 40A. The voltage reference semiconductor device 45 essentially corresponds to a precision regulator having a substantially temperature independent output voltage characteristic. Such devices are readily available, such as Motorola semiconductor device TL431. The operation of the components 31 through 46 is as follows.

Essentially, the signal at the correction circuit means input terminal 32A is just a scaled-down version of the signal at the terminal 17 related to sensed mass fluid flow. As noted above, measurements have indicated that typically this signal still has an undesired variation as a function of fluid temperature despite the fact that the fluid temperature varying element 13 has been provided in the bridge circuit 12. Thus the object of the present invention is to provide for a cost effective manner of compensating for this undesired temperature variation such that the desired output signal at the terminal 34 will still be a function of the actual mass fluid flow rate, but will be substantially less dependent on fluid temperature than the signal at the terminal 17. Essentially, the elements 36 through 46, in combination with selective adjustment of the magnitude of the resistance of resistor 14 will produce this improvement in a very cost effective manner. This is accomplished as follows.

Figure 3:
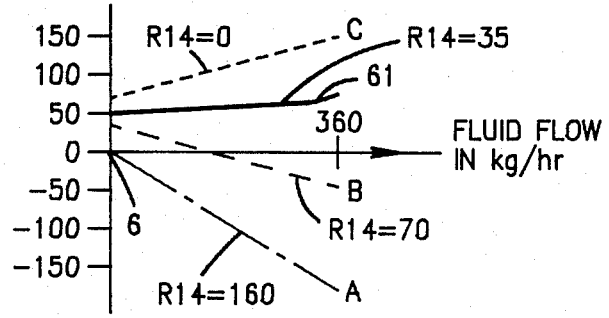
FIG. 3 is a graph illustrating the relationship between fluid flow rate and fluid temperature caused changes in a control (sense) voltage provided by the present invention and provided by other sensors not constructed in accordance with the present invention.

Referring to FIG. 3, a series of graphs are illustrated which essentially plot voltage difference versus actual flow rate of the fluid 56 between the walls 50 and 51. The horizontal axis in FIG. 3 is flow rate of the fluid 56, and the vertical axis is the voltage difference between the voltage $V_B$ at the terminal 17 taken at an elevated fluid temperature of 70° C. (degrees Centigrade), for example, and the voltage $V_B$ at the terminal 17 taken at normal room temperature, such as 25° C. Clearly if the bridge temperature varying element 13 completely compensated for all fluid temperature variations, the end result shown in FIG. 3 would comprise a line coincident with the horizontal axis. This would thus indicate that for any mass flow rate over an entire range of fluid flow rates to be measured, such as between 6 and 360 kg/hr (kilograms per hour), there would be a zero change in the voltage at the terminal 17 due to fluid temperature variation of 25° C. and 70° C. In such a situation, the present invention would not be needed since the bridge circuit 12 and circuitry 21-30 would already produce an output signal indicative of fluid flow rate and independent of fluid temperature. However, measurements of circuits comprising the components 11 through 30 have indicated that this is not readily achievable.

More specifically, adjustment of the magnitude of the bridge resistor 14 was attempted so as to achieve a zero change in the voltage $V_B$ at the terminal 17 for fluid temperatures of 25° C. and 70° C. for all flows over the flow range of 6 to 360. The results are shown in FIG. 3.

Curve A in FIG. 3 illustrates that for a magnitude of resistor 14 of 160 ohms, zero change, as function of temperature in the voltage $V_B$ at terminal 17 is achieved only at a low flow rate of 6, whereas at higher flow rates there is a very large negative deviation of the voltage $V_B$ at the terminal 17 at 70° C. as compared to the $V_B$ voltage at 25° C. Curve B indicates that for resistor 14 having a value of 70 ohms, an improved situation is achieved, but again a zero change in the voltage at the terminal 17 as a function of temperature only occurs for only one flow rate. Curve C indicates that for resistor 14 having a value of 0 ohms, a zero change in the voltage at the terminal 17 is never achieved. FIG. 3 illustrates the curves A, B and C in terms of the change (delta) of the voltage $V_B$ at the terminal 17 as a function of fluid flow for various values of the resistor 14 in the bridge circuit 12. This change in $V_B$ represents the difference in the voltage $V_B$ at the terminal 17 taken at a fluid temperature of 70° C. versus the voltage $V_B$ taken at a fluid temperature of 25° C.

Figure 4:
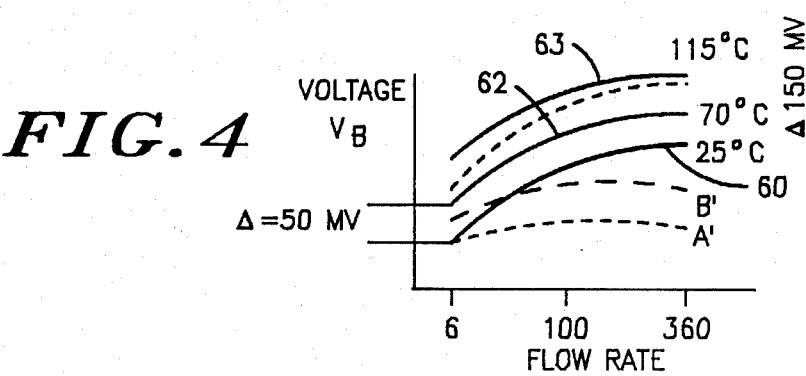
FIG. 4 is a graph illustrating fluid flow rate versus control (sense) voltage amplitude at different fluid temperatures, and illustrating this relationship for the present invention and for other sensors not utilizing the present invention.

FIG. 4 essentially illustrates the same relationships plotted as a function of the amplitude of the voltage $V_B$ at the terminal 17 as a function of fluid flow rate. However, it should be noted that FIG. 4 is not drawn to scale and just indicates general relationships.

In FIG. 4, for fluid at room temperature, corresponding to 25° C., a curve 60 is generated which illustrates that the voltage $V_B$ is a nonlinear function of sensed fluid flow rate over a flow range of 6 to 360. However, when curve 60 is compared with curves A', B' and C' in FIG. 4, which correspond to curves A, B and C in FIG. 3, respectively, and which curves correspond to the amplitude of the voltage $V_B$ at 70 degrees of fluid temperature over the same fluid flow rate range for different values of resistor 14, it is apparent that compensating for fluid temperature variations of the voltage $V_B$ over the entire fluid flow rate range would be extremely complex regardless of which value of resistor 14 was selected so as to implement either of the curves A', B' or C'. Of course, curve B' appears to provide the best compromise situation, but still, as is apparent from FIGS. 3 and 4, compensation for these types of temperature variation would be complex. This is because the amount of needed fluid temperature compensation is also a function of fluid flow rate.

The present invention proposes the selection of a resistance value for the resistor 14 which, as shown by curve 61 in FIG. 3, results in a substantially constant offset or change in the voltage $V_B$ at 70 degrees as opposed to 25 degrees throughout the entire flow range of 6 to 360. This corresponds to a resistor 14 value of 35 ohms. The fact that a substantially constant change in $V_B$ as a function of temperature over the flow range of 6 to 360 is provided by the curve 61 results in essentially implementing a series of parallel curves such as curves 62 and 63 in FIG. 4, for any fluid temperature other than 25 degrees C. Curve 62 in FIG. 4 represents the voltage $V_B$ at 70° C. and curve 63 in FIG. 4 represents the voltage $V_B$ at 115° C.

It can be seen that the family of curves 60, 62 and 63 in FIG. 4 essentially result in the rate of change of the voltage $V_B$ at terminal 17, as a function of flow rate over a "substantial range" (at least one sixth, e.g., 6 to 60, of the total desired flow rate range 6-360) of fluid flow rates to be measured, is substantially independent of fluid temperature, but that the actual amplitude of the signal $V_B$ does vary as a function of fluid temperature. Preferably the preceding "substantial range" is at the low flow end of the total flow rang so as to minimize the percent of error of the output signal, since at high flows more absolute error can occur without significantly altering the percentage of error. The basic significance of selecting the magnitude of the resistor 14 to achieve this characteristic is that now compensation for temperature variations of the control or sense voltage $V_B$ at the terminal 17 can be much more readily and cost effectively achieved by the correction circuitry 31–46 of the present invention. This is partially because the actual variation (change) of the voltage $V_B$ as a function of fluid temperature has now been made substantially independent of fluid flow rate. Also, the variation of $V_B$ as a function of fluid temperature has been found to be, at least over the critical low flow rate range of 6 to 60 kg/hr, substantially linear when the magnitude of the resistor 14 has been selected in accordance with the present invention. Thus utilization of a temperature varying resistor, such as the resistor 36, can now achieve the desired end result since typically temperature varying resistors also vary substantially linearly as a function of temperature. Even if a nonlinear fluid temperature variation of $V_B$ was achieved, compensation would still be substantially easier, since the amount of fluid temperature compensation would be independent of flow rate. Other temperature sensitive elements, such as temperature varying diodes, could be utilized instead of the temperature varying resistor 36 as long as the resultant reference signal provided at the terminal 33 implemented the desired substantially linear, fluid flow independent, temperature varying characteristic. The magnitude of the circuit components 36–46 can be adjusted to achieve the amount of required temperature variation for the compensation signal at terminal 33.

From FIG. 4 it can be seen that by selection of the proper resistance for the resistor 14, the voltage $V_B$ will essentially vary as a noncomplex and substantially linear function of fluid temperature for any flow rate in the range of 6 to 360. This is contrasted with curves A', B' or C' which indicate, in FIG. 4, that if fluid temperature was, for example, 70° C., an extremely complex temperature compensation would be required which would involve not only compensating for a fluid temperature but also taking into account the fluid flow rate. The present invention, by assuring that the voltage $V_B$ will have its rate of change as a function of flow rate independent of fluid temperature, but the amplitude of the voltage $V_B$ still being dependent on fluid temperature, enables the present invention to readily implement a temperature correction of the signal $V_B$. For the present invention temperature correction of $V_B$, the desired output signal at the terminal 34 will essentially correspond to a single FIG. 4-type curve relating the amplitude of the signal at the terminal 34 to fluid flow rate regardless of the fluid temperature.

It should be noted that it may be possible to implement any of the curves A', B' or C' for the bridge circuit 12 and then derive some sort of complex compensating signal to minimize or reduce temperature variation, but such compensation would be extremely complex unless the teachings of the present invention are followed. In addition, for bridge circuits such as the circuit 12, typically no additional, separate temperature compensation is implemented since it is generally presumed that the temperature varying element 13 can sufficiently compensate for fluid temperature variations. As is shown by the present invention, this is typically not the case.

The present invention first implements the bridge circuit 12, and then implements adjustment of the temperature compensating elements 36–41 to achieve the above-described desired results. The critical steps are (1) the selection of the magnitude of resistor 14 to achieve a change in $V_B$, as a function of fluid temperature, which is substantially independent of flow rate, and then (2) the adjustment of the compensating temperature varying signal at the terminal 38. This is accomplished as follows.

The proper value of resistor 14, so as to achieve the desired flat change in $V_B$ variation, for different fluid temperatures, as a function of flow rate, is essentially learned by experimentation. First the bridge circuit 12 and control components 21–28 are implemented as shown in FIG. 1. Then, since the heater resistor 11 is preferably to be maintained at 70° C. above the fluid temperature, the value of heater resistor 11 at 95° C. (which is 70° C. above normal ambient fluid temperature of 25° C.) is measured. The value of resistor 13 at 25° C. is also measured. Then a fixed value for resistor 16 is selected, and various values of resistor 14 are tried with resistor 15 being calculated for each value of resistor 14 so as to maintain bridge balance. Bridge balance for fluid temperature of 25° C. occurs when the relationship $$R11(\text{at } 95° \text{ C.}) = \frac{R16}{R15}(R13(\text{at } 25° \text{ C.}) + R14)$$

is satisfied. The resistances of resistors 11–16 are designated above by the notation R and corresponding numerical notations. For each value of resistor 14, the change in $V_B$, as a function of flow, for fluid temperatures of 25° C. and 70° C. is measured. Thus an appropriate value of resistor 14 is selected to give the desired substantially flat change in $V_B$, at least at low flows of 6 to 60 kg/hr.

After the bridge circuit 12 has been set, adjustment of the components 36–41 is needed to compensate for the $V_B$ temperature variation. First the actual temperature variation for fluid temperatures of 25° C. and 70° C. of the signal at terminal 32A is measured. This signal is equal to $kV_B$, with k being a proportionality constant determined by the resistor divider 31. Then the magnitude of the resistor 41 is adjusted so that the change between fluid temperatures of 25° C. and 70° C. of the signal at terminal 38 ($V_{os}$) matches the variation of the signal $kV_B$ at terminal 32A. Thus the change in $V_{os}$=-the change in $kV_B$. Then the magnitude of the resistor 37 is adjusted and this adjusts the DC offset of the signal $V_{os}$ at terminal 38 to match the DC level of the signal $kV_B$ at terminal 32A. The adjustment of resistor 37 does not affect the previously-adjusted temperature variation of the signal $V_{os}$ at the terminal 38, since the following relationship exists:

$$V_{os} = \left(1 + \frac{R37}{R41} + \frac{R36}{R41}\right)V_R,$$

where $V_R$ is the fixed reference voltage at terminal 40A, and resistances of resistors are designated by R with corresponding numerical notation. An adjustment of resistor divider 46 cannot provide just an offset adjustment of the signal $V_{os}$, since any adjustment of divider 46 will change $V_R$ and will cause a change in the temperature varying characteristic of the signal $V_{os}$. The resistors 37 and 41 could be adjusted by conventional resistor trimming techniques, such as laser trimming. Thus the configuration of the components 36–41 provides a simplified circuit for implementing an adjustable temperature varying signal.

As stated above, the present invention contemplates providing an output signal at the terminal 34 which has a magnitude (amplitude) that varies as function of fluid flow rate but is substantially less dependent on fluid temperature than the sense (control) signals at the terminals 17 and 24. However, even after fluid temperature compensation, a plot of voltage amplitude versus fluid flow rate for the signal at the terminal 34 would still reveal that the amplitude of this output signal would vary nonlinearly as a function of sensed fluid flow rate. In order to provide a linearized output, it is contemplated that the output terminal 34 in FIG. 1 is connected as an input to a digital microprocessor 47 which provides, at an output terminal 48, a linearized output. Thus the output at the terminal 48 comprises a signal having an amplitude which varies linearly as a function of sensed fluid flow rate, wherein this signal, like the signal at the terminal 34, is substantially less dependent on fluid temperature than the signals at the terminals 17 or 24. The microprocessor 47 essentially comprises a digital table look-up circuit to implement its stated linearization function.

While we have shown and described specific embodiments of this invention, further modifications and improvements will occur to those skilled in the art. Thus while preferably the present invention is described in terms of a bridge-type sensor in which a control or sense signal is developed to control power dissipation of a heater in the bridge, aspects of the present invention could be used for constant power dissipation sensors in which a fluid flow sense signal, which does not implement a heater control function, is produced. All such modifications which retain the basic underlying principles disclosed and claimed herein are within the scope of this invention.

We claim:

1. A mass fluid flow sensor operative to provide a signal indicative of sensed fluid flow rate over an entire predetermined range of expected fluid flow rates, comprising:

a heater resistor positioned in a predetermined fluid, the flow rate of which is to be measured by said mass fluid flow sensor over said entire predetermined range of fluid flow rates;

sense circuit means coupled to said heater resistor for developing, in response to heat transfer between said heater resistor and said fluid, a sense signal which has an amplitude which varies as a function of the flow rate of said fluid, the rate of change of said sense signal as a function of flow rate over a substantial range of said entire predetermined range of fluid flow rates to be measured being substantially independent of fluid temperature but said sense signal amplitude varying as a function of fluid temperature;

correction circuit means coupled to and separate from said sense circuit means for receiving and utilizing said sense signal and a received predetermined reference signal to provide an output signal, the amplitude of said output signal being related to the fluid flow rate to be measured but being substantially less dependent on fluid temperature than said sense signal;

a compensating temperature variable circuit element, separate from said sense circuit, positioned in said fluid, the flow rate of which is measured by said sense circuit means, and having an electrical characteristic varying as a function of the temperature of said fluid but independent of said fluid flow rate;

reference circuit means coupled to said compensating temperature variable circuit element to provide in response thereto a temperature variable signal, as said predetermined reference signal, said temperature variable signal having an amplitude varying as a function of the electrical characteristic of said compensating temperature variable circuit element, said temperature variable signal being independent of said fluid flow rate.

2. A mass fluid flow sensor according to claim 1 wherein said sense, reference and output signals are analog signals, and wherein said fluid flow sensor includes a digital circuit, separate from said sense circuit means and correction circuit means, which receives said output signal.

3. A mass fluid flow sensor according to claim 1 wherein said sense, reference and output signals are analog signals, and wherein said correction circuit means comprises a differential amplifier.

4. A mass fluid flow sensor according to claim 1 wherein said compensating temperature variable circuit element comprises a temperature variable resistor and said electrical characteristic corresponds to resistance.

5. A mass fluid flow sensor according to claim 4 wherein said sense signal amplitude varies substantially linearly as function of fluid temperature and wherein said resistance of said temperature variable resistor also varies substantially linearly as a function of fluid temperature.

6. A mass fluid flow sensor according to claim 1 wherein said sense circuit means includes a nontemperature varying, with respect to fluid temperature, resistor having its magnitude selected to provide said sense signal with the characteristic that its rate of change is substantially independent of fluid temperature over said substantial range of fluid flow rates.

7. A mass fluid flow sensor according to claim 6 wherein said sense circuit means includes a control circuit means coupled to said heater resistor for developing, in response to heat transfer between said heater resistor and said fluid, a control signal, coupled to said heater resistor and having a variable magnitude to alter the power dissipation of said heater resistor so as to provide a predetermined amount of heat transfer between said heater resistor and said fluid, the magnitude of said control signal varying at least as a function of the flow rate of said fluid, the magnitudes of said control and sense signals varying in the same manner.

8. A mass fluid flow sensor according to claim 7 wherein said output signal comprises an analog signal which varies nonlinearly as a function of said fluid flow rate, and wherein said mass fluid flow sensor includes a linearization apparatus which receives said output signal as an input and provides a fluid flow output signal which varies substantially linearly as a function of said fluid flow.

9. A mass fluid flow sensor according to claim 8 wherein said linearization apparatus comprises a microprocessor and wherein said control circuit means, said correction circuit means and said reference circuit means are analog circuits separate from and external to said microprocessor.

10. A mass fluid flow sensor according to claim 7 wherein said control circuit mans comprises a four-arm bridge circuit in which said heater resistor is positioned in one arm of said bridge, wherein said heater resistor has a substantial temperature resistance characteristic, and wherein the degree of balance of said bridge determines said control signal and said sense signal.

11. A mass fluid flow sensor according to claim 10 wherein said control signal provides said heater resistor at a predetermined temperature above said fluid temperature.

12. A mass fluid flow sensor according to claim 11 wherein said bridge circuit has at least one terminal and a reference terminal, said bridge circuit including means for maintaining said reference terminal at a fixed reference potential, and wherein said control circuit means includes means for utilizing said control signal to determine an operating voltage applied to said one terminal of said bridge circuit, and wherein said heater resistor is coupled between said one terminal and said reference terminal.

13. A mass fluid flow sensor according to claim 12 wherein said bridge circuit has first and second circuit paths, each comprising a pair of bridge arms connected in series, between said one terminal and said reference terminal, said heater resistor being positioned in said first circuit path and a temperature variable circuit element, different from said compensating temperature variable circuit element, being positioned in said fluid and in said second circuit path and in a bridge arm.

14. A mass fluid sensor according to claim 13 which includes a substantially nontemperature varying resistor in said second circuit path in series with and in the same bridge arm as said temperature variable circuit element, said nontemperature varying resistor having a magnitude selected such that the rate of change of said control signal and said sense signal as a function of flow rate over a substantial range of fluid flow rates to be measured is substantially independent of fluid temperature, but the magnitude of said control signal varies as a function of said fluid temperature.

15. A mass fluid flow sensor according to claim 14 wherein said control signal magnitude varies substantially linearly as a function of fluid temperature, and wherein said reference circuit means temperature variable signal also varies substantially linearly as a function of said fluid temperature.

16. A mass fluid flow sensor according to claim 14 wherein said control signal magnitude varies substantially linearly as a function of fluid temperature, and wherein said compensating temperature variable circuit element comprises a temperature variable resistor having its resistance vary substantially linearly as a function of fluid temperature.

17. A mass fluid flow sensor operative to provide a signal indicative of sensed fluid flow rate over an entire predetermined range of expected fluid flow rates, comprising:

a heater resistor positioned in a predetermined fluid, the flow rate of which is to be measured by said mass fluid flow sensor over said entire predetermined range of fluid flow rates;

sense circuit means coupled to said heater resistor for developing, in response to heat transfer between said heater resistor and said fluid, a sense signal which has an amplitude which varies as a function of the flow rate of said fluid, the rate of change of said sense signal as a function of flow rate over a substantial range of said entire predetermined range fluid flow rates to be measured being substantially independent of fluid temperature but said sense signal amplitude varying as a function of fluid temperature;

correction circuit means coupled to and separate from said sense circuit means for receiving and utilizing said sense signal and a received predetermined reference signal to provide an output signal, the amplitude of said output signal being related to the fluid flow rate to be measured but being substantially less dependent on fluid temperature than said sense signal;

a compensating temperature variable circuit element, separate from said sense circuit, positioned in said fluid, the flow rate of which is measured by said sense circuit means, and having an electrical characteristic varying as a function of the temperature of said fluid but substantially independent of said fluid flow rate;

reference circuit means coupled to said compensating temperature variable circuit element to provide in response thereto a temperature variable signal, as said predetermined reference signal, said temperature variable signal having an amplitude varying as a function of the electrical characteristic of said compensating temperature variable circuit element, said temperature variable signal being substantially independent of said fluid flow rate, wherein said reference circuit means comprises:

an amplifier having inverting and noninverting input terminals and an output terminal at which said predetermined reference signal is provided in accordance with the difference between signals at the input terminals;

a fixed, substantially nontemperature varying reference signal provided at one of the amplifier input terminals;

a temperature variable resistor, which is said compensating temperature variable circuit element, and a first nontemperature variable resistor connected in series between another one of the amplifier input terminals and the amplifier output terminal; and a second nontemperature variable resistor connected from said one of said input terminals to a fixed references potential, said first and second resistors being adjustable.

18. A mass fluid sensor according to claim 1 wherein said correction circuit means includes a differential amplifier receiving said sense signal and said reference signal as inputs and providing said output signal as an output.

19. A mass air flow sensor according to claim 17 wherein said one input terminal is the noninverting input terminal and wherein said another input terminal is the inverting input terminal.

20. A mass air flow sensor according to claim 19 wherein said amplifier is an operational amplifier.

* * * * *